(12) United States Patent
Holcomb et al.

(10) Patent No.: US 10,368,074 B2
(45) Date of Patent: Jul. 30, 2019

(54) OPPORTUNISTIC FRAME DROPPING FOR VARIABLE-FRAME-RATE ENCODING

(71) Applicant: Microsoft Technology Licensing, LLC, Redmond, WA (US)

(72) Inventors: Thomas W. Holcomb, Bothell, WA (US); Shyam Sadhwani, Bellevue, WA (US); Bakkama Srinath Reddy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 15/074,902

(22) Filed: Mar. 18, 2016

(65) Prior Publication Data
US 2017/0272755 A1 Sep. 21, 2017

(51) Int. Cl.
*H04N 19/146* (2014.01)
*H04N 19/132* (2014.01)
(Continued)

(52) U.S. Cl.
CPC ......... *H04N 19/146* (2014.11); *H04N 19/132* (2014.11); *H04N 19/137* (2014.11);
(Continued)

(58) Field of Classification Search
CPC .......................... H04N 19/146; H04N 19/132
(Continued)

(56) References Cited

U.S. PATENT DOCUMENTS

| 6,573,945 B1 | 6/2003 | Wu et al. |
| 8,374,246 B2 | 2/2013 | Raveendran et al. |

(Continued)

FOREIGN PATENT DOCUMENTS

| WO | WO 2007/038724 | 4/2007 |
| WO | WO 2008/128898 | 10/2008 |

OTHER PUBLICATIONS

Gorur et al., "Skip Decision and Reference Frame Selection for Low-Complexity H.264/AVC Surveillance Video Coding," *IEEE Trans. on Circuits and Systems for Video Technology*, vol. 24, No. 7, pp. 1156-1169 (Jul. 2014).
(Continued)

*Primary Examiner* — Jeffery A Williams
(74) *Attorney, Agent, or Firm* — Klarquist Sparkman, LLP

(57) ABSTRACT

Innovations in opportunistic frame dropping for variable-frame-rate encoding of digital video are presented. In general, a computing system selectively drops a frame when the cost of encoding the frame (e.g., in terms of use of computational resources and/or power) is expected to outweigh the benefit of encoding the frame (e.g., in terms of better quality). For example, a frame dropping module detects whether there is significant change in a given frame relative to a control frame, which is a previous frame stored in a control frame buffer. If significant change is detected, the frame dropping module stores the given frame in the control frame buffer, thereby replacing the control frame, and passes the given frame to a video encoder. Otherwise, the frame dropping module drops the given frame without replacing the control frame in the control frame buffer and without passing the given frame to the video encoder.

20 Claims, 10 Drawing Sheets

(51) Int. Cl.
*H04N 19/172* (2014.01)
*H04N 19/137* (2014.01)
*H04N 19/58* (2014.01)
H04N 19/176 (2014.01)
H04N 19/142 (2014.01)

(52) U.S. Cl.
CPC .......... *H04N 19/172* (2014.11); *H04N 19/58* (2014.11); *H04N 19/142* (2014.11); *H04N 19/176* (2014.11)

(58) Field of Classification Search
USPC .................................................. 375/240.02
See application file for complete search history.

(56) References Cited

U.S. PATENT DOCUMENTS

| | | | |
|---|---|---|---|
| 8,737,479 B2 | 5/2014 | Kumar et al. | |
| 8,804,845 B2 | 8/2014 | Rodriguez et al. | |
| 8,861,601 B2 | 10/2014 | Dane et al. | |
| 9,154,749 B2 | 10/2015 | MacInnis et al. | |
| 2005/0047504 A1* | 3/2005 | Sung | H04N 19/105 375/240.2 |
| 2006/0164543 A1 | 7/2006 | Richardson et al. | |
| 2008/0025388 A1 | 1/2008 | Kim et al. | |
| 2009/147854 A1 | 6/2009 | Dane et al. | |
| 2010/0027663 A1 | 2/2010 | Dai et al. | |
| 2011/0109758 A1* | 5/2011 | Liang | H04N 19/00163 348/222.1 |
| 2013/0128948 A1 | 5/2013 | Rabii et al. | |
| 2013/0268621 A1 | 10/2013 | Mese et al. | |
| 2014/0086310 A1 | 3/2014 | Tanner et al. | |

OTHER PUBLICATIONS

Bhattacharyya et al., "A Novel Frame Skipping Method in Transcoder, with Motion Information, Buffer Fullness and Scene Change Consideration," *European Signal Processing Conf.*, pp. 1814-1818 (Aug. 2009).

Drago et al., "Adaptive Logarithmic Mapping for Displaying High Contrast Scenes," *Eurographics*, vol. 22, No. 3, pp. 419-426 (Sep. 2003).

Hoang et al., "Efficient Cost Measures for Motion Estimation at Low Bit Rates," *IEEE Trans. on Circuits and Systems for Video Technology*, vol. 8, No. 4, pp. 488-500 (Aug. 1998).

Hwang et al., "Motion Vector Re-estimation and Dynamic Frame-Skipping for Video Transcoding," *Asilomar Conf. on Signals, Systems and Computers*, pp. 1606-1610 (Nov. 1998).

International Search Report and Written Opinion dated Jun. 9, 2017, from International Patent Application No. PCT/US2017/021700, 15 pp.

Pan et al., "Adaptive frame skipping based on spatio-temporal complexity for low bit-rate video coding," *Journal of Visual Communication and Image Representation*, vol. 17, No. 3, pp. 554-563 (Jun. 2006).

* cited by examiner software 180 implementing one or more innovations for opportunistic frame dropping for variable-frame-rate encoding

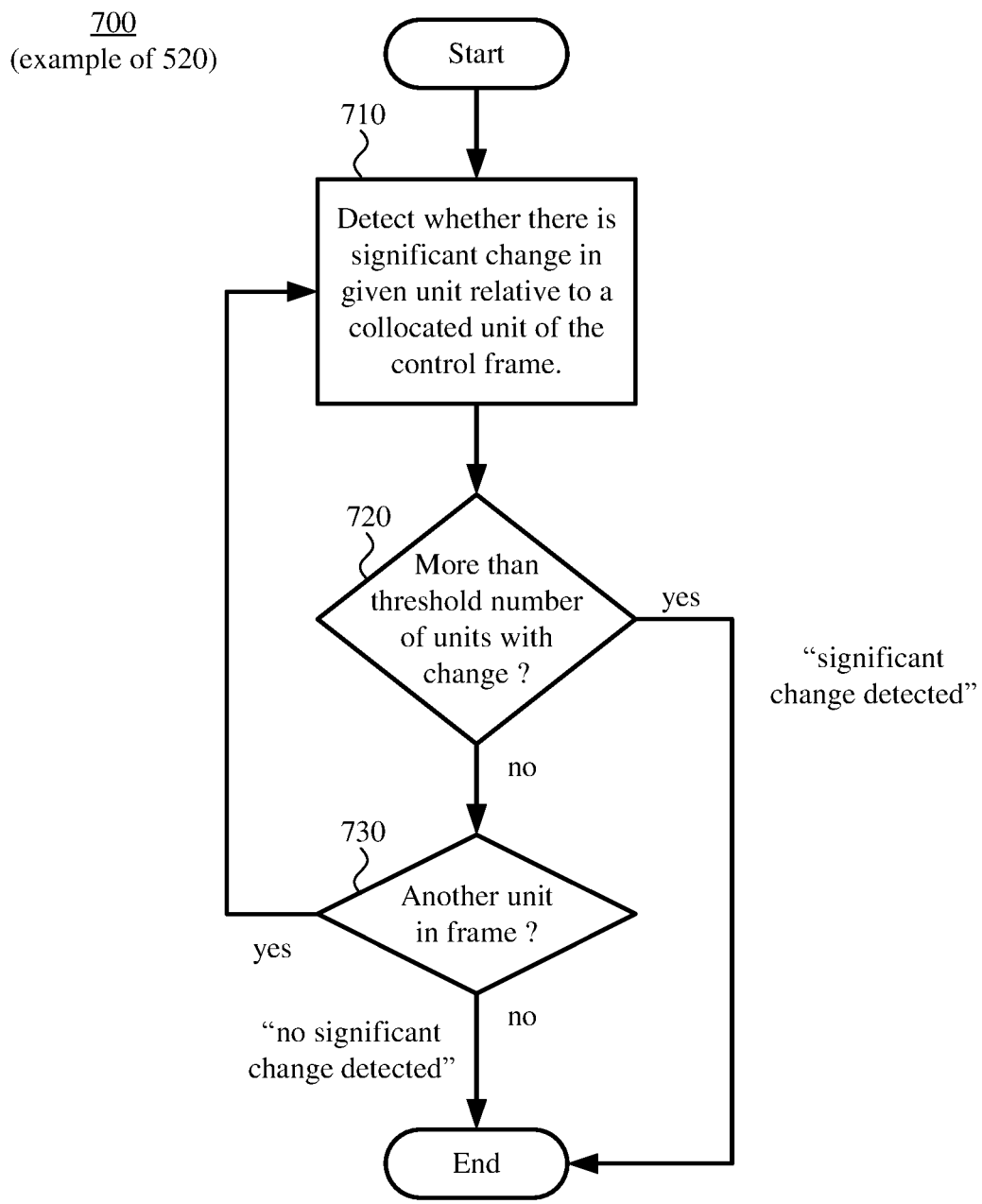

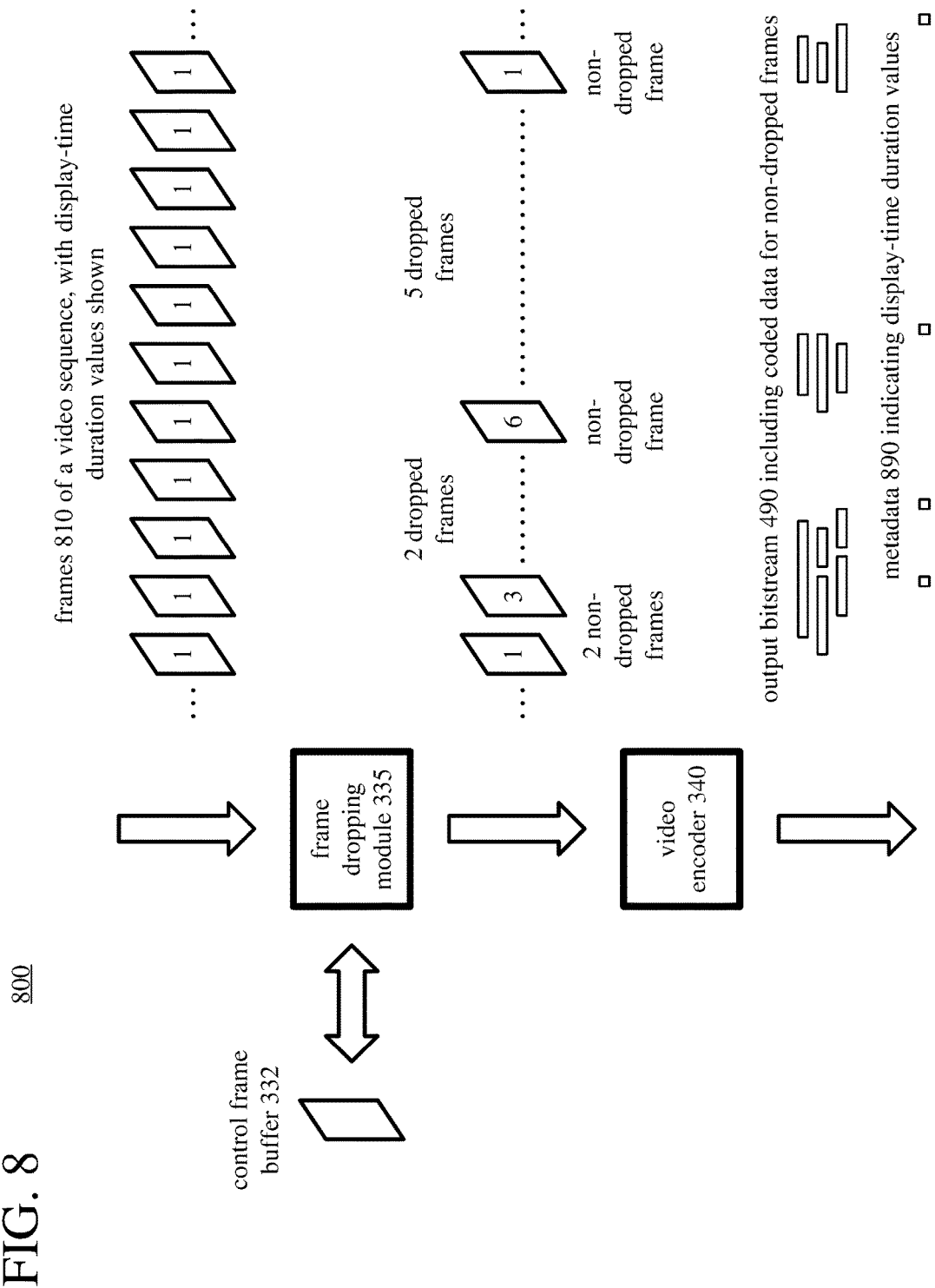

FIG. 9      900 do {
    accept a given input frame (INP)
    /* analyze INP with respect to the control frame (CONTROL) */
    if DetectSignificantChange(INP, CONTROL) is SIG_CHANGE_DETECTED{
        set CONTROL = INP
        pass INP to encoding stage }
    else { /* no significant change between INP and CONTROL */
        drop INP
        (optionally) call AdjustDisplayTimeDuration(INP, CONTROL) } }
while (more input frames)

FIG. 10      1000 function DetectSignificantChange(INP, CONTROL) {
    set num_ch = number of color components to evaluate
    set N = block size for NxN blocks
    set height = height of INP in terms of sample values
    set width = width of INP in terms of sample values
    for (cidx = 0; cidx < num_ch; cidx++){
        for (j = 0; j < height; j = j + N) {
            for (i = 0; i < width; i = i + N) {
                diff = NxN_Diff(INP, CONTROL, cidx, i, j, N)
                indicator = NxN_Signature(INP, cidx, i, j, N)
                if diff > Calc_Threshold(indicator, N) {
                    return SIG_CHANGE_DETECTED }
            }
        }
    }
    return NO_SIG_CHANGE_DETECTED
}

FIG. 11   1100

```
/* example of NxN_Diff that computes block-wise sum of absolute differences (SAD) */
function NxN_Diff(INP, CONTROL, cidx, i, j, N) {
        diff = 0;
        for (x = 0; x<N; x++) {
                for (y = 0; y<N; y++) {
                        diff = diff + Abs(INP[cidx][i+x][j+y] – CONTROL[cidx][i+x][j+y])
                }
        }
        return diff
}
```

FIG. 12   1200

```
/ * example of NxN_Signature that computes average (DC) value of block */
function NxN_Signature(INP, cidx, i, j, N) {
        indicator = 0;
        for (x = 0; x<N; x++) {
                for (y = 0; y<N; y++) {
                        indicator = indicator + Abs(INP[cidx][i+x][j+y])
                }
        }
        indicator = indicator / (N*N)
        return indicator
}
```

FIG. 13 1300

```
/* example of Calc_Threshold that maps DC value to threshold for comparison to SAD */
function Calc_Threshold(indicator, N) {
        set bit_depth = number of bits per sample of INP
        threshold = N*N + N*N * indicator /(2^bit_depth);
        return threshold;
}
```

FIG. 14 1400

```
/* example of AdjustDisplayTimeDuration, which is called if INP is to be dropped */
function AdjustDisplayTimeDuration(INP, CONTROL)
        CONTROL.dtd = CONTROL.dtd + INP.dtd
```

OPPORTUNISTIC FRAME DROPPING FOR VARIABLE-FRAME-RATE ENCODING

BACKGROUND

Digital video creation, streaming, and playback are widely practiced activities. With increasing spatial resolutions, frame rates, and sample bit depths, and with high dynamic range content and 3D viewing options, users expect richer and more realistic experiences when playing back digital video on any device. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263, H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. A video codec standard typically defines options for the syntax of an encoded video bitstream, detailing parameters in the bitstream when particular features are used in encoding and decoding. In many cases, a video codec standard also provides details about the decoding operations a video decoder should perform to achieve conforming results in decoding. Aside from codec standards, various proprietary codec formats define other options for the syntax of an encoded video bitstream and corresponding decoding operations.

Irrespective of which video codec standard or format is used, encoding video content is highly resource intensive. Whether video encoding is performed using general-purpose computer hardware (e.g., central processing units running software) or special-purpose computer hardware for "accelerated" encoding, video encoding still requires significant power and computational resources. These concerns are exacerbated on a low-power device such as a mobile phone, tablet computer, laptop computer, etc. On such a device, it is common to see a significant drop in battery life as soon as video encoding starts on the device, especially if a software implementation is used for the video encoding.

In a typical video sequence, most regions of a given frame are the same, or change only slightly, compared to frames before the given frame and after the given frame. Most video codec standards and formats use inter-picture prediction to exploit such frame-to-frame redundancy in a video sequence, and thereby improve quality or reduce bit rate of the video when compressed. For example, if a block of sample values in the given frame is predicted using inter-picture prediction, a video encoder estimates the motion of the block relative to one or more other, previously encoded/decoded frames, which are available for reference when encoding/decoding the given frame. The other, previously encoded/decoded frames are called reference frames. When the video encoder finds a matching block within a reference frame for the block of the given frame, the video encoder represents the matching block, e.g., using an identifier of the reference frame and the location of the matching block (relative to the location of the block of the given frame). The video encoder can determine differences between the block of the given frame and the matching block, then encode those differences. If the block of the given frame matches a block at the same location in a reference frame, the block of the given frame can be "skipped" by copying the "collocated" block from the reference frame. Similarly, if the entire given frame matches a reference frame, the given frame can be "skipped" by copying the reference frame. In either case (skipped block or skipped frame), the video encoder spends resources on encoding of the skipped block/frame, and the encoded video bitstream includes bits that represent the skipped block/frame.

Encoders for different video codec standards and formats have become very efficient at exploiting redundancy in digital video to improve quality and reduce bit rate. Such gains often have a high cost, however, in terms of usage computational resources and power.

SUMMARY

In summary, the detailed description presents innovations in opportunistic frame dropping for variable-frame-rate encoding of digital video. In general, a computing system selectively drops a frame when the cost of encoding the frame (e.g., in terms of use of computational resources and/or power) is expected to outweigh the benefit of encoding the frame. For example, the system detects whether a frame of a video sequence exhibits significant change compared to a control frame, which is a previous frame in the video sequence. If no significant change is detected, the system drops the frame without encoding it, which saves computational resources and power that otherwise would have been used encoding the frame.

According to one aspect of the innovations described herein, a computing system includes a video encoder, a control frame buffer, and a frame dropping module, which is positioned before the video encoder. The video encoder is configured to encode any non-dropped frames, among multiple frames of a video sequence, at a variable frame rate, thereby producing a bitstream. The control frame buffer is configured to store a control frame. The frame dropping module is configured to perform various operations for each given frame among one or more of the multiple frames. Based at least in part on a comparison of at least some portion (e.g., one or more units) of the given frame to at least some portion (e.g., one or more collocated units) of the control frame, the frame dropping module detects whether there is significant change in the given frame relative to the control frame. If significant change is detected, the frame dropping module stores the given frame in the control frame buffer, thereby replacing the control frame, and passes the given frame to the video encoder, such that the bitstream includes coded data for the given frame. Otherwise, if significant change is not detected, the frame dropping module drops the given frame without replacing the control frame in the control frame buffer and without passing the given frame to the video encoder, such that the bitstream lacks any coded data for the given frame. In this way, the system can selectively drop a frame when the cost of encoding the frame (e.g., with respect to use of computational resources and/or power) is expected to outweigh the benefit of encoding the frame (e.g., in terms of better quality).

According to another aspect of the innovations described herein, a computing system receives a given frame of a video sequence. The system detects whether there is significant change in the given frame relative to a control frame stored in a control frame buffer. For example, for each given unit among one or more units of the given frame, the system calculates a difference measure for sample values of the given unit relative to sample values of a collocated unit of the control frame, calculates a content-dependent threshold that depends on the sample values of the given unit, and compares the difference measure to the content-dependent threshold. Or, as another example, for each given unit among one or more units of the given frame, the system detects whether there is significant change in the given unit relative to a collocated unit of the control frame, where significant change is detected in the given frame if significant change is detected for at least a threshold number of units of the given frame. In any case, if significant change is detected in the given frame, the system stores the given frame in the control frame buffer, thereby replacing the control frame, and passes the given frame to the video encoder, such that a bitstream output by the video encoder includes coded data for the given frame. On the other hand, if significant change is not detected in the given frame, the system drops the given frame without replacing the control frame in the control frame buffer and without passing the given frame to the video encoder, such that the bitstream lacks any coded data for the given frame.

The innovations can be implemented as part of a method, as part of a computing system configured to perform operations for the method, or as part of one or more computer-readable media storing computer-executable instructions for causing a computing system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 7 is a flowchart illustrating a second example technique for detecting significant change in a given frame of a video sequence.

FIG. 8 is a diagram illustrating an example of opportunistic frame dropping for variable-frame-rate encoding, with adjustment of display-time duration values.

FIGS. 9-14 are pseudocode listings showing an example approach to opportunistic frame dropping using sum of absolute differences ("SAD") as a difference measure for a block and a content-dependent threshold based on a DC value for the block.

DETAILED DESCRIPTION

Figure 1:
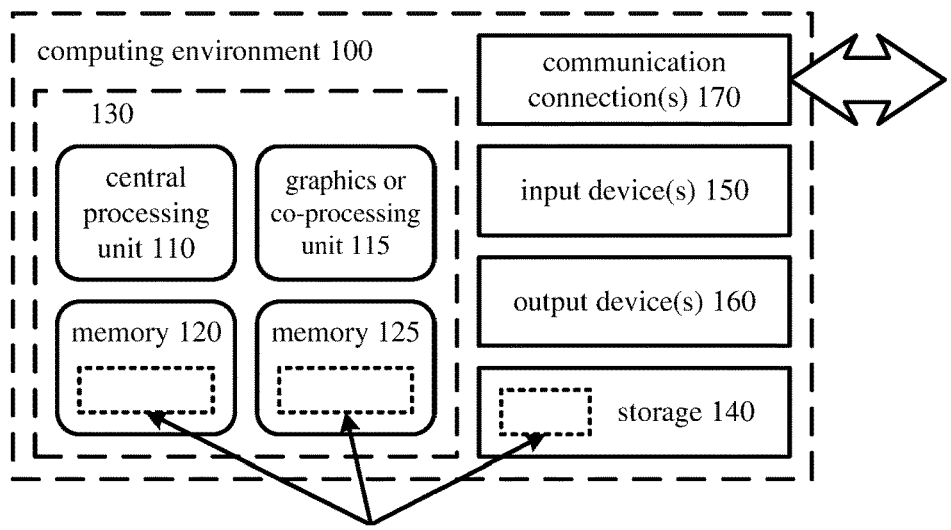
FIG. 1 is a diagram illustrating an example computing system in which some described embodiments can be implemented.

The detailed description presents innovations in opportunistic frame dropping for variable-frame rate-encoding of digital video. In general, a computing system selectively drops a frame when the cost of encoding the frame (e.g., in terms of use of computational resources and/or power) is expected to outweigh the benefit of encoding the frame. For example, the system detects whether a frame of a video sequence exhibits significant change compared to a control frame, which is a previous frame in the video sequence. If no significant change is detected, the frame is deemed sufficiently static compared to the previous frame. In this case, the system drops the frame without encoding it, which saves coded bits, computational resources, and power that otherwise would have been used encoding the frame. Since there is no significant change from the previous frame, display of the previous frame can simply be prolonged during video playback, such that the viewer does not notice the frame was dropped. Otherwise, if significant change is detected (the frame is not sufficiently static compared to the previous frame), the system encodes the frame.

The detailed description presents various ways to detect whether there is any significant change between frames. Many of the approaches detect perceptible motion between the frames. Various approaches can also detect changes in brightness levels that do not correspond to motion. By following one of the approaches, the system can identify frames to drop without causing any noticeable disruption in the continuity of playback for a viewer. In some cases, the system can use bits that would otherwise have been spent encoding the dropped frames to improve the quality of the remaining frames that are encoded, which may improve overall compression performance.

The innovations described herein can be implemented in video encoders for any of various video codec standards or formats (e.g., H.265 standard, H.264 standard, VP9 format, VP8 format), or extensions or variations thereof, including future video codec standards or formats that permit video encoding at a variable frame rate. Opportunistic frame dropping for variable-frame-rate video encoding as described herein can be used when encoding video for real-time communication, a surveillance feed, remote desktop presentation, live transcoding, live streaming, or other delay-sensitive applications. Opportunistic frame dropping for variable-frame-rate video encoding as described herein can also be used for offline transcoding, offline coding, or other delay-insensitive applications.

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. For example, a video encoder can use the overall framework described herein for opportunistic frame dropping with any of various approaches to detecting significant changes in frames. As another example, a video encoder can use the overall framework described herein for opportunistic frame dropping with or without adjustment of display-time duration values. As still another example, a video encoder can use any of the various approaches described herein for detecting significant changes in frames with different approaches to frame dropping. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for opportunistic frame dropping for variable-frame-rate encoding, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic media such as magnetic disks, magnetic tapes or cassettes, optical media such as CD-ROMs or DVDs, or any other medium which can be used to store information and which can be accessed within the computing system (100). The storage (140) stores instructions for the software (180) implementing one or more innovations for opportunistic frame dropping for variable-frame-rate encoding.

The input device(s) (150) may be a touch input device such as a keyboard, mouse, pen, or trackball, a voice input device, a scanning device, or another device that provides input to the computing system (100). For video, the input device(s) (150) may be a camera, video card, screen capture module, TV tuner card, or similar device that accepts video input in analog or digital form, or a CD-ROM or CD-RW that reads video input into the computing system (100). The output device(s) (160) may be a display, printer, speaker, CD-writer, or other device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations thereof. Thus, the computer-readable media can be, for example, volatile memory, non-volatile memory, optical media, or magnetic media. As used herein, the term computer-readable media does not include transitory signals or propagating carrier waves.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. The term "module" can indicate a program module (e.g., software compiled to execute on a general-purpose hardware), a component of an integrated circuit, or a combination of special-purpose hardware and general-purpose hardware with software implementing the functionality described herein.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "detect" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
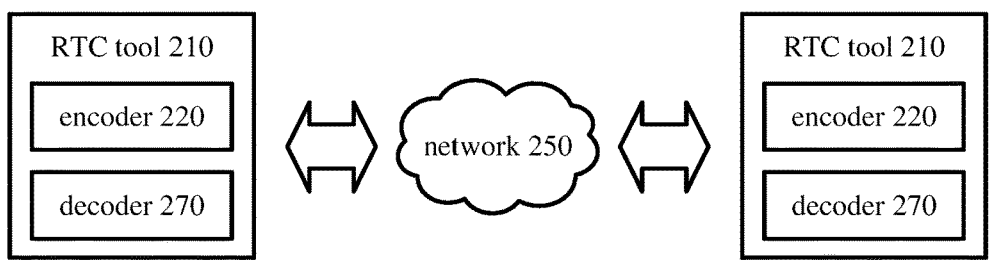
FIGS. 2a and 2b are diagrams illustrating example network environments in which some described embodiments can be implemented.
Figure 2B:
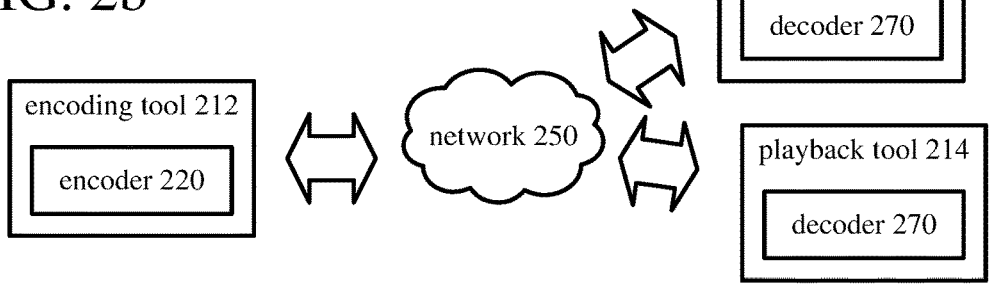

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. Each RTC tool (210) also includes a frame dropping module (not shown) that provides opportunistic frame dropping. A given encoder (220) can produce output compliant with the H.265/HEVC standard, SMPTE 421M standard, ISO/IEC 14496-10 standard (also known as H.264/AVC), another standard, or a proprietary format such as VP8 or VP9, or an extension or variation thereof, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
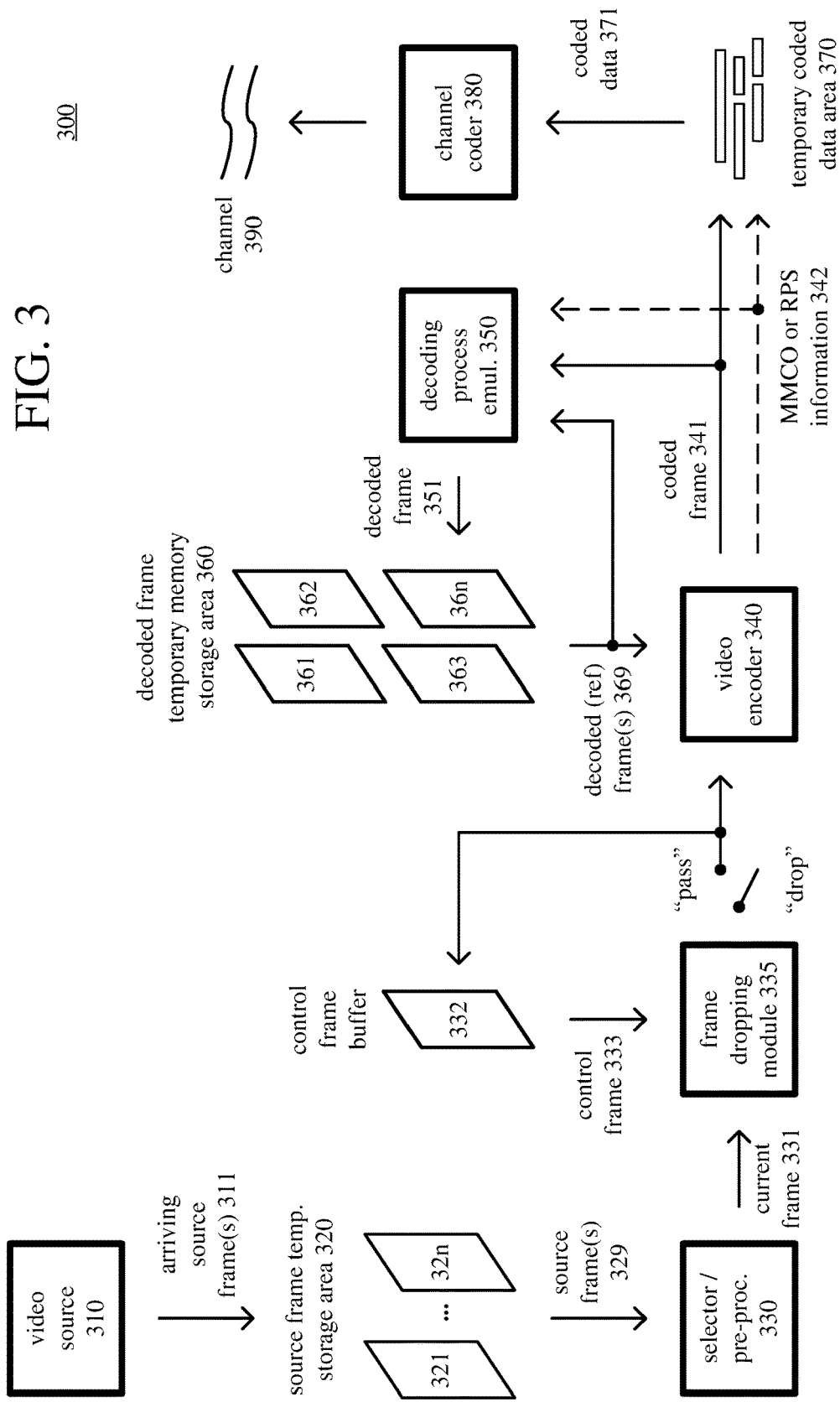
FIG. 3 is a diagram illustrating an example video encoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270).

In the network environment (202) shown in FIG. 2b, an encoding tool (212) includes an encoder (220) that encodes video for delivery to multiple playback tools (214), which include decoders (270). The encoding tool (212) also includes a frame dropping module (not shown) that provides opportunistic frame dropping. The unidirectional communication can be provided for a video surveillance system, web camera monitoring system, remote desktop conferencing presentation or sharing, wireless screen casting, cloud computing or gaming, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). A playback tool (214) can include client-side controller logic for managing connections with the encoding tool (212).

III. Example Encoder Systems.

FIG. 3 shows an example video encoder system (300) in conjunction with which some described embodiments may be implemented. The video encoder system (300) includes a frame dropping module (335), which implements opportunistic frame dropping on a series of frames provided to a variable-frame-rate video encoder (340).

The video encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The video encoder system (300) can be adapted for encoding of a particular type of content. The video encoder system (300) can be implemented as part of an operating system module, as part of an application library, as part of a standalone application, or using special-purpose hardware. Overall, the video encoder system (300) receives a sequence of source video frames (311) from a video source (310) and produces encoded data as output to a channel (390). The encoded data output to the channel can include content encoded using one or more of the innovations described herein.

The video source (310) can be a camera, tuner card, storage media, screen capture module, or other digital video source. In the context of transcoding, the video source (310) can be a video decoder that produces reconstructed frames.

The video source (310) produces a sequence of frames at a frame rate of, for example, 30 frames per second ("fps"). As used herein, the term "frame" generally refers to source, coded or reconstructed image data. For progressive-scan video, a frame is a progressive-scan video frame. For interlaced video, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame (329) from the source frame storage area (320) to encode as the current frame (331). The order in which frames are selected by the frame selector (330) for input to the video encoder (340) may differ from the order in which the frames are produced by the video source (310), e.g., the encoding of some frames may be delayed in order, so as to allow some later frames to be encoded first and to thus facilitate temporally backward prediction. The video encoder (340) can accept frames at a variable frame rate (e.g., 0.5 fps, 1 fps, 5 fps, 10 fps, 30 fps, 60 fps), and the frame rate can change dynamically depending on the behavior of the frame dropping module (335). Before the video encoder (340), the video encoder system (300) can include a pre-processor (also shown as 330) that performs pre-processing of the current frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. In general, a pixel is the set of one or more collocated sample values for a location in a frame, which may be arranged in different ways for different chroma sampling formats. The pre-processing can also include filtering of sample values for different video effects.

The frame dropping module (335) analyzes frames of the sequence to detect significant changes and selectively drops frames. In particular, the frame dropping module (335) compares the current frame (331) to a control frame (333), which is stored in a control frame buffer (332). The control frame buffer (332) is a location in memory that stores one frame, the control frame (333). While being configured to store one control frame, the control frame buffer (332) can further be configured to store one or more other control frames, as described below in section IV.F. If there is a significant change between the current frame (331) and the control frame (333), the frame dropping module (335) passes the current frame (331) to the video encoder (340) and replaces the control frame (333) with the current frame (331) in the control frame buffer (332). Various approaches to evaluating whether there is a significant change between the control frame (333) and current frame (331) are described below. Otherwise, if there is no significant change between the current frame (331) and the control frame (333), the frame dropping module (335) drops the current frame (331). In this case, the control frame buffer (332) is not updated, and the coded data (371) produced by the video encoder (340) lacks coded data for the current frame (331). Additional features of the frame dropping module (335) are described in the next section.

If the current frame (331) is not dropped, the video encoder (340) encodes the current frame (331) to produce a coded frame (341). The video encoder (340) receives the current frame (331) as an input video signal and produces encoded data for the coded frame (341) in a coded video bitstream as output. Generally, the video encoder (340) includes multiple encoding modules that perform encoding tasks such as partitioning into tiles, intra-picture prediction estimation and prediction, motion estimation and compensation, frequency transforms, quantization, and entropy coding. The exact operations performed by the video encoder (340) can vary depending on compression format and can also vary depending on encoder-optional implementation decisions. The format of the output encoded data can be Windows Media Video format, VC-1 format, MPEG-x format (e.g., MPEG-1, MPEG-2, or MPEG-4), H.26x format (e.g., H.261, H.262, H.263, H.264, H.265), or VPx format, or a variation or extension thereof, or another format.

If a unit of the current frame (331) is predicted using inter-picture prediction, a motion estimator in the video encoder (340) estimates the motion of blocks of sample values of the unit with respect to one or more reference frames. The current frame (331) can be entirely or partially coded using inter-picture prediction. When multiple reference frames are used, the multiple reference frames can be from different temporal directions or the same temporal direction. A decoded picture buffer ("DPB"), which is an example of decoded frame temporary memory storage area (360) as shown in FIG. 3, buffers one or more reconstructed previously coded frames for use as reference frames. In contrast, the control frame buffer (332) in FIG. 3 stores a pre-encoded version of a previous frame, not a reconstructed version.

The video encoder (340) produces encoded data for the coded frame (341) in an elementary bitstream, such as a coded video bitstream. The syntax of the bitstream is typically defined in a codec standard or format, or an extension or variation thereof. After output from the video encoder (340), the elementary bitstream is typically packetized or organized in a container format, as explained below.

The video encoder (340) also produces memory management control operation ("MMCO") signals (342) or reference picture set ("RPS") information. The RPS is the set of pictures that may be used for reference in motion compensation for a current frame or any subsequent frame. If the current frame (331) is not the initial frame that has been encoded, when performing its encoding process, the video encoder (340) may use one or more previously encoded/decoded frames (369) that have been stored in a decoded frame temporary memory storage area (360). Such stored decoded frames (369) are used as reference frames for inter-picture prediction of the content of the current frame (331). The MMCO/RPS information (342) indicates to a video decoder which reconstructed frames may be used as reference frames, and hence should be stored in a frame storage area. Alternatively, information about which reconstructed frames may be used as reference frames is signaled in some other way.

With reference to FIG. 3, the coded frame (341) and MMCO/RPS information (342) (or information equivalent to the MMCO/RPS information (342), since the dependencies and ordering structures for frames are already known at the video encoder (340)) are processed by a decoding process emulator (350). The decoding process emulator (350) implements some of the functionality of a video decoder, for example, decoding tasks to reconstruct reference frames. In a manner consistent with the MMCO/RPS information (342), the decoding process emulator (350) determines whether a given coded frame (341) needs to be reconstructed and stored for use as a reference frame in inter-picture prediction of subsequent frames to be encoded. If a coded frame (341) needs to be stored, the decoding process emulator (350) models the decoding process that would be conducted by a video decoder that receives the coded frame (341) and produces a corresponding decoded frame (351). In doing so, when the video encoder (340) has used decoded frame(s) (369) that have been stored in the decoded frame storage area (360), the decoding process emulator (350) also uses the decoded frame(s) (369) from the storage area (360) as part of the decoding process. The decoding process emulator (350) may be implemented as part of the video encoder (340).

As shown in FIG. 3, the decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the video encoder (340) for use as reference frames. After modeling the decoding process, the decoding process emulator (350) stores a newly decoded frame (351) in a frame buffer (361, 362, etc.) that has been identified in this manner.

As shown in FIG. 3, the coded frame (341) and MMCO/RPS information (342) are buffered in a temporary coded data area (370). The coded data that is aggregated in the coded data area (370) contains, as part of the syntax of the elementary bitstream, encoded data for one or more frames (non-dropped frames). The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction encoding and analog signal modulation.

Depending on implementation and the type of compression desired, modules of the video encoder system (300) can be added, omitted, split into multiple modules, combined with other modules, and/or replaced with like modules. In alternative embodiments, encoder systems or encoders with different modules and/or other configurations of modules perform one or more of the described techniques. For example, although FIG. 3 shows the frame dropping module (335) separated from the frame selector/pre-processor (330) and the video encoder (340), the frame dropping module (335) can be integrated with the pre-processor (330) or integrated with the video encoder (340). Thus, the frame dropping module (335) can be part of the frame selector/pre-processor (330) or the video encoder (340). In any case, whether the frame dropping module (335) is integrated with the selector/pre-processor (330), separated from the selector/pre-processor (330) and the video encoder (340), or integrated with the video encoder (340), the frame dropping module (335) is positioned before the video encoder (340), in that frame dropping happens before encoding operations.

Specific embodiments of encoder systems typically use a variation or supplemented version of the video encoder system (300). Specific embodiments of video encoders typically use a variation or supplemented version of the video encoder (340). The relationships shown between modules within the video encoder system (300) indicate general flows of information in the video encoder system (300), respectively; other relationships are not shown for the sake of simplicity. In general, a given module of the video encoder system (300) or video encoder (340) can be implemented by software executable on a CPU, by software controlling special-purpose hardware (e.g., graphics hardware for video acceleration), or by special-purpose hardware (e.g., in an ASIC).

IV. Opportunistic Frame Dropping.

This section describes innovations in opportunistic frame dropping for variable-frame rate-encoding of digital video. A frame dropping module selectively drops a frame when the cost of encoding the frame (e.g., in terms of use of computational resources and/or power) is expected to outweigh the benefit of encoding the frame (e.g., in terms of quality improvement). For example, the frame dropping module detects whether a given frame of a video sequence exhibits significant change compared to a control frame, which is a previous frame in the sequence. If significant change is detected, the given frame is encoded. On the other hand, if no significant change is detected, the frame dropping module drops the given frame without encoding it. Frame dropping can save coded bits, computational resources, and power that otherwise would have been used encoding the frame. In contrast to frame dropping, when a video encoder "skips" a frame or region of a frame (e.g., macroblock, block), the bitstream includes at least some coded data for the skipped frame/region (e.g., parameters for syntax elements in a header), and the encoder performs at least some encoding operations on the skipped frame/region.

A. Examples of Opportunistic Frame Dropping.

Figure 4:
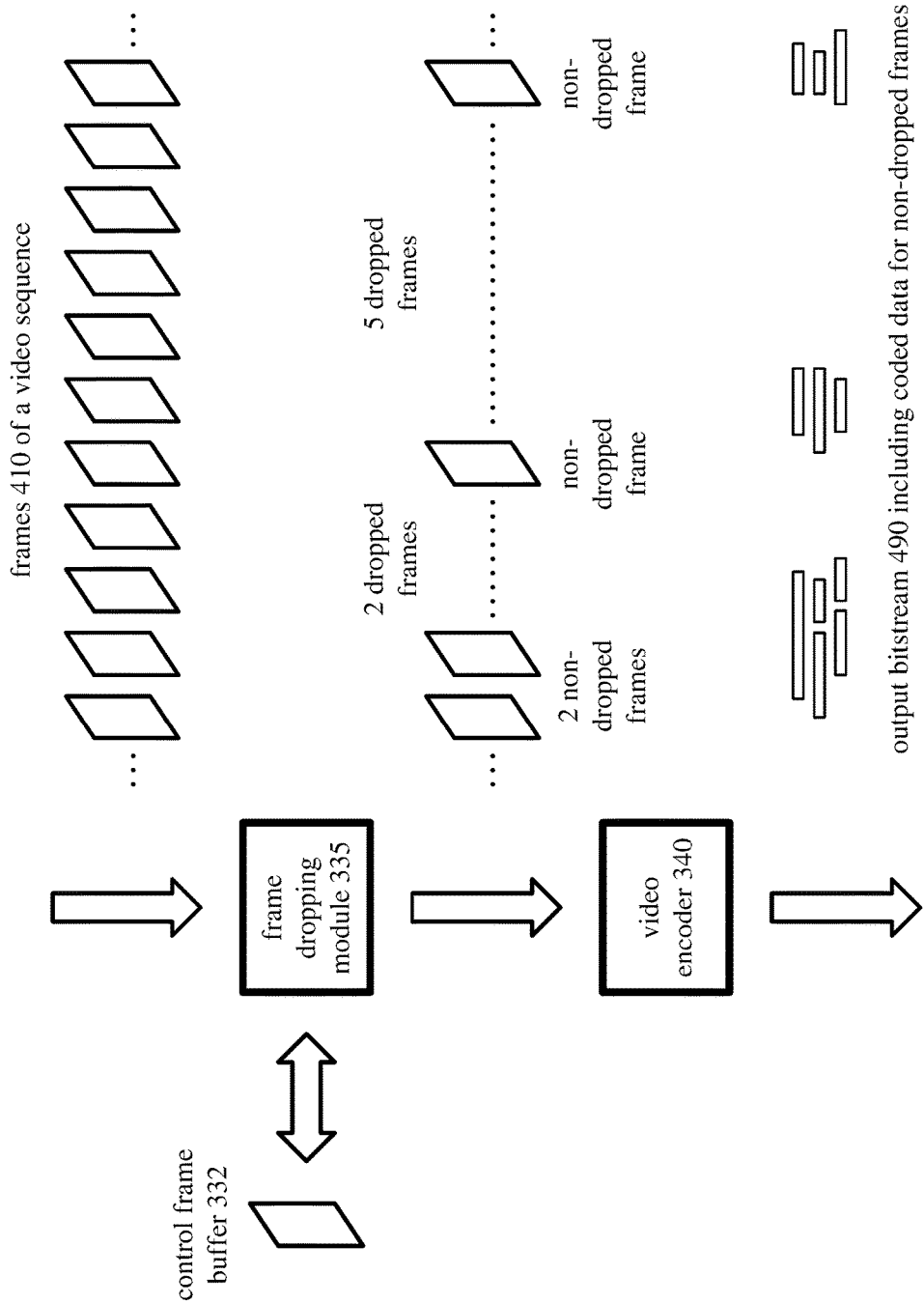
FIG. 4 is a diagram illustrating an example of opportunistic frame dropping for variable-frame-rate encoding.

FIG. 4 shows an example (400) of opportunistic frame dropping for variable-frame-rate encoding. In FIG. 4, a frame dropping module (335) receives frames (410) of a video sequence. The frame dropping module (335) selectively drops or passes different frames of the sequence to a video encoder (340). The frame dropping module (335) can drop an arbitrary number of frames between two frames that are encoded. In the example of FIG. 4, the frame dropping module (335) passes two frames to the video encoder (340), then drops two frames. After that, the frame dropping module (335) passes another frame to the video encoder (340) before dropping five frames. The video encoder (340) outputs a bitstream (490) that includes coded data for the non-dropped frames, but lacks coded data for the dropped frames.

For a given one of the frames (410) of the sequence, the frame dropping module (335) compares the given frame to a previous frame (control frame) in display order, which is buffered in the control frame buffer (332). The control frame can be an input version of the previous frame from a camera or other video source, a pre-processed version of the previous frame, or some other pre-encoded version of the previous frame. The control frame is not a previously encoded/reconstructed version of the previous frame. In any case, whatever processing has been applied to the control frame is also applied to the given frame before comparison with the control frame.

If the frame dropping module (335) passes the given frame to the video encoder (340), the frame dropping module (335) replaces the control frame that is currently stored in the control frame buffer (332) with the given frame. That is, the given frame becomes the new control frame. A control frame can remain in the control frame buffer (332) for an arbitrarily long period, until it is replaced with another non-dropped frame. Thus, a given frame may be compared to a control frame that is one frame earlier, two frames earlier, five frames earlier, or some other number of frames earlier in the sequence in display order. Unlike approaches that compare successive frames of a video sequence, having the control frame buffer (332) store a control frame indefinitely, until replacement of the control frame with another non-dropped frame, guards against situations in which frames change very gradually (e.g., slight brightening or darkening from frame-to-frame).

B. Approaches to Opportunistic Frame Dropping, in General.

Figure 5:
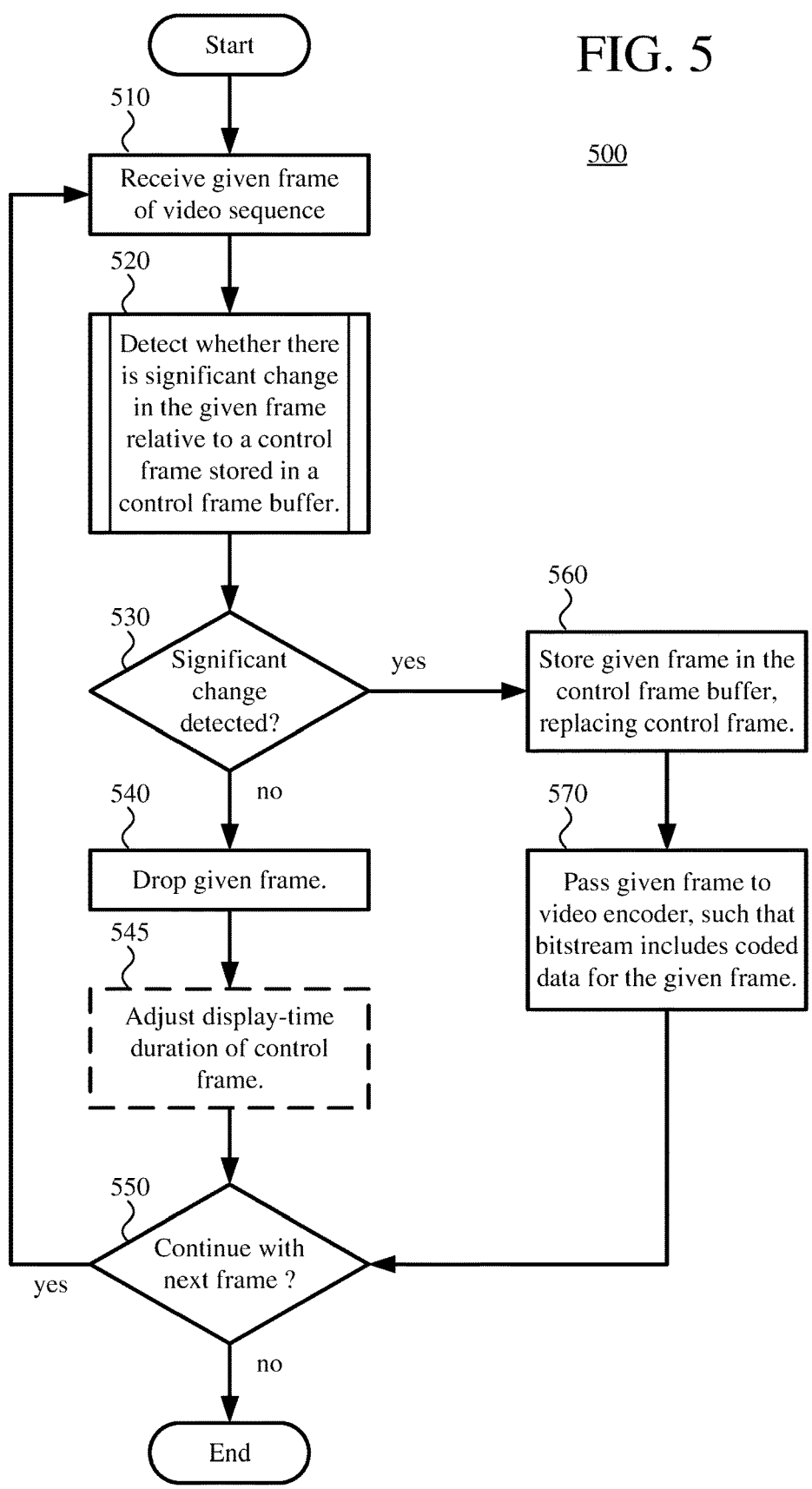
FIG. 5 is a flowchart illustrating a generalized technique for opportunistic frame dropping for variable-frame-rate encoding.

FIG. 5 shows a generalized technique (500) for opportunistic frame dropping for variable-frame-rate encoding. A frame dropping module as described above with reference to FIGS. 3 and 4, or other frame dropping module, is configured to perform the technique (500). In doing so, the frame dropping module interoperates with a control frame buffer, which is configured to store a control frame. While being configured to store one control frame, the control frame buffer can further be configured to store one or more additional control frames, as described below in section IV.F. The frame dropping module also interoperates with a video encoder, which is configured to encode any non-dropped frames, among multiple frames of a video sequence, at a variable frame rate, thereby producing a bitstream.

For a given frame among one or more of the multiple frames of the video sequence, the frame dropping module receives (510) the given frame of the video sequence. The frame dropping module can receive the given frame from a video source, which is configured to produce the multiple frames as input to the frame dropping module. For example, the video source is a camera, screen capture module, or video decoder. Or, the frame dropping module can receive the given frame from a pre-processing module, which is configured to produce the multiple frames as input to the frame dropping module, where the multiple frames are pre-processed versions of frames received from a video source.

The frame dropping module detects (520) whether there is significant change in the given frame relative to the control frame stored in the control frame buffer. Typically, the detection process is based at least in part on a comparison of at least some portion (e.g., one or more units) of the given frame to at least some portion (e.g., one or more collocated units) of the control frame. For example, the frame dropping module performs the technique (600) described with reference to FIG. 6 or performs the technique (700) described with reference to FIG. 7. Alternatively, the frame dropping module follows another approach to detect whether there is significant change in the given frame relative to the control frame.

The frame dropping module checks (530) whether significant change is detected in the given frame relative to the control frame. If significant change is detected, the frame dropping module stores (560) the given frame in the control frame buffer, thereby replacing the control frame. The control frame buffer can be configured to store the control frame for an unlimited period of time, until replacement of the control frame by another one of the multiple frames. Thus, an arbitrary number of frames in display order can separate the control frame and the one of the multiple frames that replaces it. If significant change is detected, the frame dropping module also passes (570) the given frame to the video encoder, such that the bitstream includes coded data for the given frame.

On the other hand, if significant change is not detected, the frame dropping module drops (540) the given frame without replacing the control frame in the control frame buffer and without passing the given frame to the video encoder. In this case, the bitstream lacks any coded data for the given frame. In some implementations, if significant change is not detected, the frame dropping module also adjusts (545) a display-time duration value for the control frame, as explained below in section IV.D. In other implementations, the frame dropping module does not adjust display-time duration values in response to dropping of frames. Instead, the frame dropping module relies on a video decoder to continue display of the previous frame corresponding to a control frame indefinitely, without regard to duration of display, until coded data for a new frame in the sequence is received and decoded by the video decoder.

With reference to FIG. 5, the frame dropping module checks (550) whether to continue with the next frame in the sequence. If so, the frame dropping module continues by receiving (510) the next frame of the video sequence.

The system can be initialized in various ways. For example, the control frame buffer is configured to store, as the control frame, a default frame upon initialization. In this case, when the initial frame of the video sequence is compared to the default frame, a significant change is typically detected, such that the initial frame is stored in the control frame buffer and passed to the video encoder. Alternatively, for an initial frame among the multiple frames, the frame dropping module is configured to store the initial frame in the control frame buffer and pass the initial frame to the video encoder without detecting change in the initial frame.

C. Approaches to Detecting Significant Changes.

A frame dropping module uses any of various approaches to identify which frames can be dropped without adversely affecting the perceived quality of video during playback. In general, the frame dropping module attempts to determine whether there is any user-perceptible difference between a given frame and previous frame (control frame in the control frame buffer) and, if not, drops the given frame.

Figure 6:
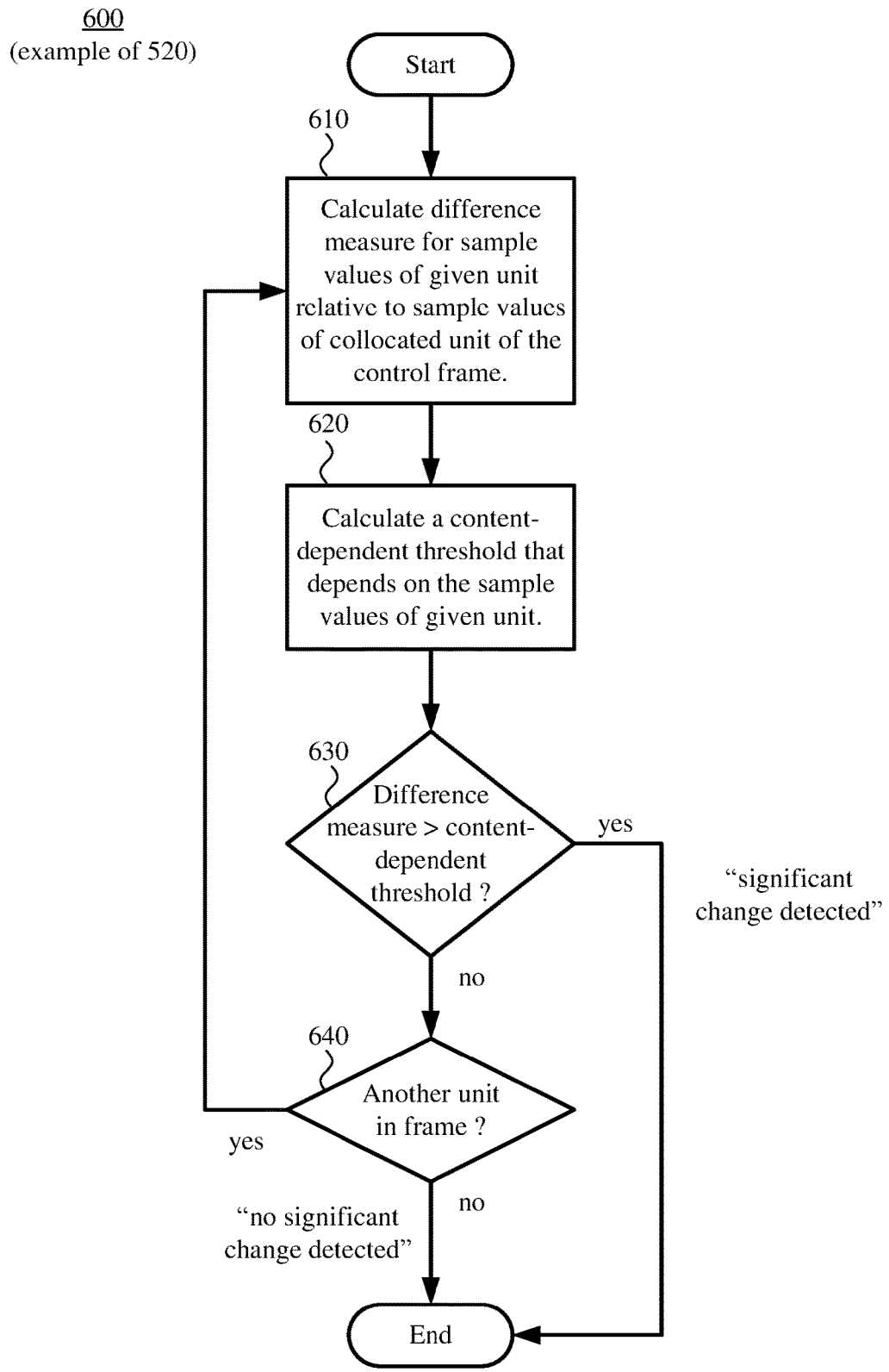
FIG. 6 is a flowchart illustrating a first example technique for detecting significant change in a given frame of a video sequence.

FIGS. 6 and 7 show two example techniques (600, 700) for detecting significant change in a given frame of a video sequence. A frame dropping module as described above with reference to FIGS. 3 and 4, or other frame dropping module, is configured to perform one or more of the techniques (600, 700).

The frame dropping module performs the technique (600) and/or technique (700) on a unit-by-unit basis. As used herein, the term "block" can indicate a macroblock, residual data unit, coding tree block, coding block, prediction block or transform block, or some other set of sample values, depending on context. The term "unit" can indicate a macroblock, coding tree unit, coding unit, prediction unit, transform unit or some other set of blocks, or it can indicate a single block, depending on context. The size of the unit depends on implementation. For example, the frame dropping module sets a value N for N×N units, where N is 8, 16, 32, or some other value.

In the technique (600) shown in FIG. 6, the frame dropping module calculates a difference measure and content-dependent threshold on a unit-by-unit basis for one or more units of the given frame. With reference to FIG. 6, for a given unit among one or more units of the given frame, the frame dropping module calculates (610) a difference measure for sample values of the given unit relative to sample values of a collocated unit of the control frame. The difference measure depends on implementation. For example, the difference measure is sum of absolute difference ("SAD"), sum of squared differences ("SSD"), mean absolute difference ("MAD"), or mean squared error ("MSE"). Alternatively, the difference measure is calculated in some other way.

The frame dropping module also calculates (620) a content-dependent threshold that depends on the sample values of the given unit. The content-dependent threshold depends on implementation. For example, the frame dropping module calculates a signature value for the given unit, then maps the signature value to the content-dependent threshold using a mapping function. The content-dependent threshold is calibrated according to the types of signature values and difference measures calculated. In general, the content-dependent threshold is higher for a block in which distortion is expected to be less visible, and lower for a block in which distortion is expected to be more visible.

The signature value can represent the overall brightness of the sample values of the given unit (e.g., an average, or DC, sample value for the given unit). Alternatively, the signature value can be calculated in some other way (e.g., median sample value for the given unit, sum of the absolute values for the sample values of the given unit, sum of the squares of the sample values of the given unit). For a signature value that represents overall brightness, the content-dependent threshold is higher for higher (brighter) signature values and lower for lower (darker) signature values, since a given amount of distortion tends to be less visible in brighter areas than in darker areas.

If the magnitude of the difference measure depends on the number of sample values in the unit (e.g., SAD, SSD), the mapping function can depend on the size of the unit being evaluated. For example, a parameter N indicating the size of an N×N unit can be provided to the mapping function, in addition to the signature value. (Or, the parameter N can be "hard-coded" in the mapping function if the unit size is always N×N.) The mapping function can use the parameter N to calculate one or more factors of the threshold, which vary in proportion to the number of sample values in the N×N unit. The content-dependent threshold is typically higher for larger units and lower for smaller units, since the difference measure is expected to increase in proportion to an increase in the number of sample values or decrease in proportion to a decrease in the number of sample values.

The mapping function can incorporate a linear mapping of signature values to threshold values. In this case, at any point in the range of signature values, a given amount of change in signature value causes the same degree of change in the content-dependent threshold. For example, if the signature value and difference measure are computed from sample values that have had gamma correction (gamma compression) applied, the mapping function can determine content-dependent thresholds in linear proportion with the gamma-corrected sample values. Or, if the signature value and difference measure are computed from sample values without any gamma correction applied, the mapping function can determine content-dependent thresholds in linear proportion with the linear-scale sample values.

Alternatively, the mapping function can incorporate a non-linear mapping of signature values to threshold values. In this case, for different signature values, a given amount of change in signature value may cause a different degree of change in the content-dependent threshold. For example, if the signature value and difference measure are computed from sample values that have had gamma correction applied, the mapping function can compensate for (undo) the gamma correction, such that the content-dependent threshold increases relatively slowly at lower signature values (for which distortion is expected to be more visible), but increases relatively quickly at higher signature values (for which distortion is expected to be less visible). Or, if the signature value and difference measure are computed from sample values without any gamma correction applied, the mapping function can incorporate gamma expansion, such that the content-dependent threshold increases relatively slowly at lower signature values (for which distortion is expected to be more visible), but increases relatively quickly at higher signature values (for which distortion is expected to be less visible).

Alternatively, the mapping function depends on other and/or additional factors.

The frame dropping module compares (630) the difference measure to the content-dependent threshold. If the difference measure is greater than the content-dependent threshold, significant change is detected for the unit. In the technique (600) shown in FIG. 6, as soon as significant change is detected in any unit, significant change is deemed to have been detected for the given frame. Otherwise (the difference measure is not greater than the content-dependent threshold), the frame dropping module checks (640) whether to continue with another unit of the given frame. If so, the frame dropping module continues by calculating (610) a difference measure and calculating (620) a content-dependent threshold for the next unit of the given frame. If there are no more units in the given frame, and no significant change has been detected in any unit of the given frame, no significant change is deemed to have been detected for the given frame.

In the technique (700) shown in FIG. 7, the frame dropping module checks for significant change in units of a given frame, on a unit-by-unit basis, until the frame dropping module reaches a threshold number of units with significant change or reaches the end of the given frame. With reference to FIG. 7, for a given unit among one or more units of the given frame, the frame dropping module detects (710) whether there is significant change in the given unit relative to a collocated unit of a control frame in a control frame buffer. For example, the frame dropping module detects whether there is significant change in the given unit relative to the collocated unit using the calculating operations (610, 620) and comparison operation (630) of the technique (600) shown in FIG. 6 or some other technique.

The frame dropping module checks (720) whether more than a threshold number of units with significant change has been detected. If so, significant change is deemed to have been detected for the given frame. The threshold number of units depends on implementation. For example, the threshold number of units is an absolute count of units in the given frame (e.g., one unit, three units, ten units) or a proportion of units in the given frame (e.g., 1 percent, 2 percent, 5 percent). Thus, significant change is detected in the given frame if significant change is detected for at least the threshold number of units of the given frame.

Otherwise (the threshold number of units with significant change has not been reached for the given frame), the frame dropping module checks (730) whether to continue with another unit of the given frame. If so, the frame dropping module continues by detecting (710) whether there is significant change in the next unit relative to a collocated unit of the control frame. If there are no more units in the given frame, and the threshold number of units with significant change has not been reached for the given frame, no significant change is deemed to have been detected for the given frame.

Alternatively, a frame dropping module uses another approach to detect significant change in a given frame of a video sequence. For example, in addition to or instead of comparing sample values as described above, the frame dropping module can receive input from the video encoder and use such input when determining whether there is significant change in the given frame. The input can include encoding parameters such as quantization levels, buffer fullness levels, rate control settings, picture type values, slice type values, and/or motion vector values. Some parameters (e.g., picture type values, slice type values, motion vector values, quantization levels) may provide feedback that helps the frame dropping module assess the extent of change in the given frame, but involve the video encoder performing at least some encoding operations on the video frame. Other parameters (e.g., buffer fullness levels, rate control settings) may provide hints or guidance with respect to the current state of the video encoder, without involving the video encoder performing any encoding operations on the given frame. Such feedback, hints, or guidance can help the frame dropping module account for whether dropping of the given frame will affect the final user experience by introducing perceptible distortion (e.g., choppy video). If quantization levels are very high, or a buffer of encoded data is almost full, the video encoder may be expected to introduce significant distortion during "lossy" stages of compression for the given frame, such that, in comparison, simply dropping the given frame may have a relatively small impact on overall quality.

Or, as another example, in addition to or instead of comparing sample values as described above, the frame dropping module can receive input from a pre-processor that has analyzed the given frame. The input can include information such as average sample values. Or, in addition to or instead of comparing sample values as described above, the frame dropping module can receive both input from a pre-processor and input from a video encoder, as described above.

D. Adjusting Display-Time Duration Values.

In some implementations, if a frame dropping module drops a frame that follows a control frame in a video sequence, the frame dropping module adjusts a display-time duration value for the control frame, thereby signaling to a video decoder that the control frame should be displayed for a longer period of time. The longer period of time accounts for the original display-time duration for the control frame and the display-time duration(s) for any dropped frames that follow the control frame. Otherwise, if a video decoder uses display-time duration values to control how long frames are displayed after decoding, failure to adjust the display-time duration values of control frames could disrupt playback when frames are dropped.

For example, the frame dropping module tracks the display-time duration value for a control frame during encoding. If a given frame (after the control frame) is dropped, the frame dropping module increases the display-time duration value for the control frame by the display-time duration value for the dropped frame. If the given frame is not dropped, the display-time duration value for the control frame can be signaled, as part of the bitstream of coded data for the video sequence or as part of side information.

FIG. 8 shows an example (800) of opportunistic frame dropping for variable-frame-rate encoding, with adjustment of display-time duration values for control frames. Most of the elements of FIG. 8 are the same as in FIG. 4. Only the differences compared to FIG. 4 are addressed in this section. In FIG. 8, display-time duration values are shown for the frames (810) of a video sequence. When the frame dropping module (335) drops one of the frames (810), the frame dropping module (335) adjusts the display-time duration value for the control frame that is stored in the control frame buffer (332). FIG. 8 also shows the display-time duration values for non-dropped frames (including control frames). Some of the display-time duration values are adjusted display-time duration values. For example, for the non-dropped frame that precedes two dropped frames, the adjusted display-time duration value is 3 times the single-frame display-time duration. For the non-dropped frame that precedes five dropped frames, the adjusted display-time duration value is 6 times the single-frame display-time duration. In addition to the output bitstream (490) that includes coded data for the non-dropped frames, metadata (890) indicating display-time duration values is output.

The way that the display-time duration value for a control frame is signaled depends on implementation. For example, the display-time duration value can be specified in a field of metadata organized according to a media program stream format, transport stream format, media container format, media system multiplexing protocol, or transport protocol. Alternatively, for some implementations, instead of or in addition to signaling in such a field of metadata, the display-time duration value can be signaled as part of an elementary coded video bitstream (e.g., in a supplemental enhancement information message). The display-time duration value can be represented as a length of time after a presentation time stamp ("PTS"). According to various media program stream formats, transport stream formats, media container formats, media system multiplexing protocols, transport protocols, etc., a PTS indicates a time of initial display for a frame. If display-time duration value is not already available for adjustment, a new field of metadata can be added that specifies the display-time duration value.

When adjusting the display-time duration value for a control frame, the frame dropping module can account for frame rate conversion, whether content is interlaced, whether 3:2 pulldown applies, or other content-specific factors. In addition to being useful to a video decoder to manage display timing, display-time duration values can be used during transcoding when adjusting the frame rate of video content, performing de-interlacing, or performing other processing operations.

As noted above, in some implementations, a frame dropping module does not adjust display-time duration values for control frames. Instead, the frame dropping module relies on a video decoder continuing to display the previous frame corresponding to a control frame until a new frame is decoded and displayed.

E. Example Implementations.

FIGS. 9-14 show an example approach to opportunistic frame dropping using SAD as a difference measure for a block and using a content-dependent threshold based on a DC value for the block.

FIG. 9 shows a pseudocode listing (900) for the overall process of a frame dropping module, which evaluates frames of a video sequence on a frame-by-frame basis. For a given input frame (INP), the frame dropping module analyzes the input frame relative to a control frame (CONTROL). A frame, whether input frame or control frame, can be stored as an array of sample values that are organized, at least logically, by color component (luma, chroma) and by spatial dimension (width, height).

In FIG. 9, the frame dropping module calls the function DetectSignificantChange, passing the input frame (INP) and the control frame (CONTROL). (In FIGS. 9-14, parameters can be passed by reference, e.g., with pointers to memory locations, or passed by value. Typically, arrays of sample values are passed by reference.) If a significant change is detected in the given frame (that is, the function DetectSignificantChange returns SIG_CHANGE_DETECTED as its result), the frame dropping module sets the control frame (CONTROL) to be the given input frame (INP) and passes the given input frame to the encoding stage. Otherwise, the frame dropping module drops the given input frame (INP) and, optionally, calls the function AdjustDisplayTimeDuration. The frame dropping module repeats the process shown in FIG. 9 for the next input frame, so long as there are more input frames in the video sequence.

FIG. 10 shows a pseudocode listing (1000) for an example implementation of the function DetectSignificantChange, which compares sample values of the given input frame (INP) to collocated sample values of the control frame (CONTROL). For a given input frame (INP), the frame dropping module sets the value of a variable num_ch, which indicates the number of color components to evaluate. In some implementations, the frame dropping module evaluates only the luma component (component 0) of the given input frame (INP). Alternatively (as shown in FIG. 10), the frame dropping module also evaluates chroma components (components 1 and 2) of the given input frame (INP). The frame dropping module sets the value of a variable N, which indicates the block size of N×N blocks to evaluate in the given input frame (INP). The value of N depends on implementation (e.g., 8, 16, 32). The frame dropping module also sets the values of variables that indicate the height and width of the given input frame (INP).

For a given color component, the frame dropping module evaluates blocks of sample values on a block-by-block basis. For a given block, the frame dropping module calculates a difference measure (diff) by calling the function N×N_Diff and calculates a signature value (indicator) by calling the function N×N_Signature. The frame dropping module calculates a content-dependent threshold, which depends on the signature value (indicator) and variable N, by calling the function Calc_Threshold. If the difference measure (diff) is greater than the content-dependent threshold, the function DetectSignificantChange returns a value indicating that significant change has been detected. Otherwise, the frame dropping module continues by evaluating the next block. If there is no block for which the difference measure (diff) is greater than the content-dependent threshold, after evaluating all blocks, the function DetectSignificantChange returns a value indicating that no significant change has been detected.

FIG. 11 shows a pseudocode listing (1100) for an example implementation of the function N×N_Diff, which calculates SAD as a difference measure. As input parameters, the function N×N_Diff accepts the given input frame (INP), the control frame (CONTROL), an identifier (cidx) of the color channel, a block position (i, j) in the two frames, and a block size (N). On a sample-by-sample basis, the function accumulates the absolute differences between sample values of the N×N block whose top-left corner is at position (i, j) in the given input frame (INP) and collocated sample values of the N×N block whose top-left corner is at position (i, j) in the control frame (CONTROL). The function N×N_Diff returns the difference measure (diff). Alternatively, the function N×N_Diff calculates and returns another type of difference measure, e.g., SSD, MAD, MSE.

FIG. 12 shows a pseudocode listing (1200) for an example implementation of the function N×N_Signature, which calculates the average (DC) value of a block of the given input frame (INP). As input parameters, the function N×N_Signature accepts the given input frame (INP), an identifier (cidx) of the color channel, a block position (i, j) in the frame, and a block size (N). On a sample-by-sample basis, the function accumulates the absolute values of sample values of the N×N block whose top-left corner is at position (i, j) in the given input frame (INP). The function divides that total by $N^2$ and returns the average value (indicator). Alternatively, the function N×N_Signature calculates and returns another type of signature value, e.g., median value, the sum of the absolute values of the sample values in the block, or the sum of the squares of the sample values in the block.

The content-dependent threshold calculated for a given block depends on its signature value. In general, the difference measure for the given block is an objective, quantified amount of distortion in the given block, compared to the collocated block in the control frame. The content-dependent threshold changes depending on how effective the given block is expected to be at masking distortion, which is estimated based on the signature value of the given block. The threshold is higher if the given block is expected to mask distortion relatively well; otherwise, the threshold is lower. In implementation, the way the content-dependent threshold is calculated depends on the type of difference measure (e.g., SAD, SSE, MAD, MSE) and type of signature value (e.g., DC, median).

FIG. 13 shows a pseudocode listing (1300) for an example implementation of the function Calc_Threshold, which calculates a content-dependent threshold for a block of the given input frame (INP). As input parameters, the function Calc_Threshold accepts the signature value (indicator) for the block and block size N. Distortion tends to be more noticeable in a dark region than in a light region. For example, for a given amount of distortion (in absolute terms), the distortion might be perceptible in the dark region, but not in the light region. In FIG. 13, the content-dependent threshold depends on the DC value of the block. When the DC value is low, the block is darker, and the threshold is lower. When the DC value is high, the block is lighter, and the threshold is higher. Specifically, the function Calc_Threshold sets a variable bit_depth that indicates the number of bits per sample (e.g., 8 bits for values 0 . . . 255). The threshold returned by the function is threshold=$N^2+N^2*$(indicator/$2^{bit\_depth}$), where the factor (indicator/$2^{bit\_depth}$) is a value between 0 and 1 that increases on a linear basis as the signature value increases. The following table shows examples of values for the content-dependent threshold calculated as shown in FIG. 13.

TABLE 1

| Linear mapping of DC values to thresholds. | |
|---|---|
| DC | threshold |
| 0 | 256 |
| 10 | 266 |
| 20 | 276 |
| 30 | 286 |
| 40 | 296 |
| 50 | 306 |
| 60 | 316 |
| 70 | 326 |
| 80 | 336 |
| 90 | 346 |
| 100 | 356 |
| 110 | 366 |
| 120 | 376 |
| 130 | 386 |
| 140 | 396 |
| 150 | 406 |
| 160 | 416 |
| 170 | 426 |
| 180 | 436 |
| 190 | 446 |
| 200 | 456 |
| 210 | 466 |
| 220 | 476 |
| 230 | 486 |
| 240 | 496 |
| 250 | 506 |

In Table 1, the mapping of DC values to corresponding thresholds is a linear mapping. A given amount of change in signature value causes the same degree of change in the content-dependent threshold. Alternatively, the function Calc_Threshold can use a non-linear mapping. For example, the non-linear mapping can incorporate gamma expansion such that the threshold increases slower for low DC values and higher for high DC values. For a gamma (γ) factor of 2.2, e.g., the threshold returned by the function is $N^2+N^2*$(indicator/$2^{bit\_depth}$)$^{2.2}$, as illustrated in Table 2.

TABLE 2

Non-linear mapping (γ = 2.2) of DC values to thresholds.

| DC | threshold (γ = 2.2) |
|---|---|
| 0 | 256 |
| 10 | 256 |
| 20 | 257 |
| 30 | 258 |
| 40 | 260 |
| 50 | 263 |
| 60 | 266 |
| 70 | 271 |
| 80 | 276 |
| 90 | 282 |
| 100 | 288 |
| 110 | 296 |
| 120 | 304 |
| 130 | 314 |
| 140 | 324 |
| 150 | 335 |
| 160 | 347 |
| 170 | 360 |
| 180 | 374 |
| 190 | 389 |
| 200 | 405 |
| 210 | 422 |
| 220 | 439 |
| 230 | 458 |
| 240 | 478 |
| 250 | 499 |

As another example, suppose the difference measures and DC values are computed from gamma-corrected values. In this case, the function Calc_Threshold can use a linear mapping (as shown in FIG. 13, or with γ=1 for purposes of the threshold calculation) or use a non-linear mapping to compensate for the gamma correction. For example, if the gamma correction used a gamma factor of γ=0.4545, the non-linear mapping can incorporate gamma factor of γ=2.2 to compensate for the gamma correction. Table 3 illustrates thresholds returned for example gamma-corrected DC values (γ=0.4545) with a linear mapping (γ=1) or non-linear mapping (γ=2.2).

TABLE 3

Linear and non-linear mappings of gamma-corrected DC values to thresholds.

| DC (γ = .4545) | threshold (γ = 1) | threshold (γ = 2.2) |
|---|---|---|
| 0 | 256 | 256 |
| 59 | 315 | 266 |
| 80 | 336 | 276 |
| 97 | 353 | 286 |
| 110 | 366 | 296 |
| 122 | 378 | 306 |
| 132 | 388 | 316 |
| 142 | 398 | 326 |
| 151 | 407 | 336 |
| 159 | 415 | 346 |
| 167 | 423 | 356 |
| 174 | 430 | 365 |
| 181 | 437 | 375 |
| 188 | 444 | 386 |
| 195 | 451 | 397 |
| 201 | 457 | 406 |
| 207 | 463 | 416 |
| 213 | 469 | 427 |
| 218 | 474 | 436 |
| 224 | 480 | 447 |
| 229 | 485 | 456 |
| 234 | 490 | 466 |
| 239 | 495 | 476 |
| 244 | 500 | 486 |
| 249 | 505 | 497 |
| 253 | 509 | 505 |

In Table 3, the values in the first column are gamma-corrected counterparts (with γ=0.4545) of the values 0, 10, 20, 30, and so on. The values in the second column show thresholds that increase much more quickly than corresponding thresholds in Table 1. For example, the threshold in Table 1 for DC value 10 (with no gamma correction) is 266. The threshold in the middle column of Table 3 for the corresponding gamma-corrected DC value 59 (with γ=0.4545) is 315. As another example, the threshold in Table 1 for DC value 20 (with no gamma correction) is 276. The threshold in the middle column of Table 3 for the corresponding gamma-corrected DC value 80 (with γ=0.4545) is 336. The values in the third column show thresholds that, after gamma expansion to compensate for gamma-correction in the sample values, correspond to the thresholds shown in Table 1. For example, the threshold in Table 1 for DC value 10 (with no gamma correction) is 266, which is the same as the threshold in the third column of Table 3 for the corresponding gamma-corrected DC value 59 (with γ=0.4545) compensated with a non-linear mapping (with γ=2.2).

The threshold calculation in some of the preceding examples is adapted for luma sample values, whose values range from 0 to $2^{bit\_depth}-1$. For chroma sample values, the difference measure, signature value, and/or content-dependent threshold can be modified. Typically, chroma sample values have a range such as $-2^{bit\_depth-1}$ to $2^{bit\_depth-1}-1$. Thus, for 8-bit sample values, the range of chroma sample values can be -128 . . . 127. Instead of representing the average chroma sample value in a block, which may be negative, the signature value can represent the average absolute values of chroma sample values in the block, which is a positive measure of deviation from the middle value in the range (0). Also, even if gamma expansion is incorporated when calculating content-dependent thresholds for luma sample values, a linear mapping (with no gamma compression or expansion) can be used when calculating content-dependent thresholds for chroma sample values.

Alternatively, the difference measure, signature value, and content-dependent threshold can be calculated before color-space conversion (e.g., on sample values in an R, G, B color space). In this case, frame dropping decisions can be made before color-space conversion and chroma downsampling. Making frame-dropping decisions after color-space conversion into luma and chroma sample values and chroma downsampling, however, allows an encoder to emphasize the importance to perception of luma sample values relative to chroma sample values, which are decimated in the chroma downsampling.

FIG. 14 shows a pseudocode listing (1400) for an example implementation of the function AdjustDisplayTimeDuration. This function, which accepts as input parameters the given input frame (INP) and control frame (CONTROL), increases the display-time duration value of the control frame (CONTROL) by the display-time duration value of the given input frame (INP).

In the example of FIGS. 10-13, the block size N can vary. Thus, the block size N is passed as a parameter between functions. Alternatively, block size is fixed, and no block size parameter is passed between the functions. In the example of FIGS. 10-13, an identifier (cidx) of color channel is passed between some of the functions. Alternatively, only one color component (e.g., luma) is evaluated, or sample values of only one color component are passed between functions, and no color channel identifier is passed between the functions.

Depending on the video being encoded, opportunistic frame dropping as illustrated with reference to FIGS. 9-13 can allow dropping of a large number of frames without adversely affecting quality in any significant way. For example, in test video sequences with few scene changes (or no scene changes), up to 20% of frames are dropped with no significant adverse effect on quality. On the contrary, the savings in computer resources (especially processor utilization) and bitrate can potentially be translated by a video encoder into better overall rate-distortion performance (e.g., by dedicating more processing resources to motion estimation, rate control decisions, etc. for non-dropped frames, or by dedicating more bits to non-dropped frames).

F. Alternatives and Variations.

In many of the examples described herein, a control frame buffer stores a single control frame. A frame dropping module compares at least some portion (e.g., one or more units) of a given frame to at least some portion (e.g., one or more collocated units) of the single control frame, so as to detect whether there is significant change in the given frame relative to the single control frame. If significant change is detected, the frame dropping module stores the given frame in the control frame buffer, replacing the single control frame. The frame dropping module also passes the given frame to the video encoder, such that the bitstream includes coded data for the given frame. Otherwise, if significant change is not detected, the frame dropping module drops the given frame. In this case, the bitstream lacks any coded data for the given frame, since the video encoder does not encode the given frame at all. Although a decoder is expected to continue display of the previous frame corresponding to the control frame, the frame dropping module need not signal any identifier of the control frame in the control frame buffer.

Alternatively, the control frame buffer stores a set of N control frames, where N can be 2, 3, or some other number of control frames. Each of the N control frames stored in the control frame buffer is a previous frame in the video sequence (e.g., an input version of the previous frame from a camera or other video source, a pre-processed version of the previous frame, or some other pre-encoded version of the previous frame). When the control frame buffer stores multiple control frames, the frame dropping module can use a more sophisticated approach to identify frames to drop. For example, the frame dropping module compares at least some portion (e.g., one or more units) of a given frame to at least some portion (e.g., one or more collocated units) of each of the N control frames, so as to detect whether there is significant change in the given frame relative to that control frame. Or, the frame dropping module compares at least some portion (e.g., one or more units) of a given frame to at least some portion (e.g., one or more collocated units) of each of the N control frames, one control frame after another, until the frame dropping module finds a control frame for which significant change is not detected or the frame dropping module has checked all of the N control frames. If significant change is detected, the frame dropping module stores the given frame in the control frame buffer. In doing so, the frame dropping module replaces one of the N control frames if the control frame buffer already stores the maximum number of control frames. To decide which frame to replace in the control frame buffer, the frame dropping module can select the oldest control frame, the least-recently-used control frame (that is, the control frame least recently used for frame dropping purposes), or the control frame least like the given frame, or it can select the control frame to replace using other criteria. The frame dropping module also passes the given frame to the video encoder. Otherwise, if significant change is not detected, the frame dropping module drops the given frame. Even though no coded data for the given frame is output, the frame dropping module signals a control frame identifier indicating which of the N control frames was sufficiently close to the given frame for the given frame to be dropped. The control frame identifier can be signaled as part of the elementary bitstream (e.g., as an SEI message, as user data) or outside the bitstream (e.g., as a field in a container format, or in some other way). A decoder can use the control frame identifier to select a previous frame to be re-displayed in place of the given frame. The decoder can update the pool of candidate frames to be re-displayed based on information signaled by the frame dropping module or based on rules (e.g., the same rules applied by the frame dropping module to update the control frame buffer).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computing system implemented at least in part with computer hardware, the computing system comprising:
   a video encoder configured to encode any non-dropped frames, among multiple frames of a video sequence, at a variable frame rate, thereby producing a bitstream;
   a control frame buffer, outside the video encoder, configured to store a control frame, the control frame including sample values of a version of a previous frame from prior to encoding of the previous frame; and
   a frame dropping module implemented with software compiled to execute on a general purpose computer or specialized computer hardware, positioned before the video encoder to, for each given frame among one or more of the multiple frames:
      based at least in part on a comparison of at least some portion of the given frame to at least some portion of the control frame, detect whether there is significant change in the given frame relative to the control frame;
      if significant change is detected, store the given frame in the control frame buffer, thereby replacing the control frame, and pass the given frame to the video encoder, such that the bitstream includes coded data for the given frame; and
      if significant change is not detected, drop the given frame without replacing the control frame in the control frame buffer and without passing the given frame to the video encoder, such that the bitstream lacks any coded data for the given frame.

2. The computing system of claim 1, wherein the control frame buffer is configured to store, as the control frame, a default frame upon initialization.

3. The computing system of claim 1, wherein, for an initial frame, the frame dropping module is further configured to store the initial frame in the control frame buffer and pass the initial frame to the video encoder without detecting change in the initial frame.

4. The computing system of claim 1, wherein the control frame buffer is configured to store the control frame for an unlimited period of time, until replacement of the control frame by one of the multiple frames, such that an arbitrary number of frames in display order can separate the control frame and the one of the multiple frames that replaces it.

5. The computing system of claim 1, further comprising a video source configured to produce the multiple frames as input to the frame dropping module.

6. The computing system of claim 5, wherein the video source is selected from the group consisting of camera, screen capture module, and video decoder.

7. The computing system of claim 1, further comprising a pre-processing module implemented with software compiled to execute on a general purpose computer or specialized computer hardware to produce the multiple frames as input to the frame dropping module, wherein the multiple frames are pre-processed versions of frames received from a video source.

8. The computing system of claim 1, wherein, to detect whether there is significant change in the given frame relative to the control frame, the frame dropping module is configured to, for each given unit among one or more units of the given frame:
calculate a difference measure for sample values of the given unit relative to sample values of a collocated unit of the control frame;
calculate a content-dependent threshold that depends on the sample values of the given unit; and
compare the difference measure to the content-dependent threshold.

9. The computing system of claim 8, wherein the difference measure is selected from the group consisting of sum of absolute difference, sum of squared differences, mean absolute difference, and mean squared error, and wherein the content-dependent threshold depends on overall brightness of the sample values of the given unit.

10. The computing system of claim 8, wherein significant change is detected in the given frame if, for each of at least a threshold number of units of the given frame, the difference measure is more than the content-dependent threshold.

11. The computing system of claim 1, wherein the frame dropping module is further configured to, if significant change is not detected, adjust a display-time duration value for the control frame.

12. In a computing system that implements a video encoder, a method comprising:
receiving a given frame of a video sequence;
detecting whether there is significant change in the given frame relative to a control frame stored in a control frame buffer outside the video encoder, wherein the control frame includes sample values of a version of a previous frame from prior to encoding of the previous frame, including, for each given unit among one or more units of the given frame:
calculating a difference measure for sample values of the given unit relative to sample values of a collocated unit of the control frame;
calculating a content-dependent threshold that depends on the sample values of the given unit; and
comparing the difference measure to the content-dependent threshold;
if significant change is detected in the given frame, storing the given frame in the control frame buffer, thereby replacing the control frame, and passing the given frame to the video encoder, such that a bitstream output by the video encoder includes coded data for the given frame; and
if significant change is not detected in the given frame, dropping the given frame without replacing the control frame in the control frame buffer and without passing the given frame to the video encoder, such that the bitstream lacks any coded data for the given frame.

13. The method of claim 12, further comprising, if significant change is not detected, adjusting a display-time duration value for the control frame.

14. The method of claim 12, wherein the difference measure is selected from the group consisting of sum of absolute difference, sum of squared differences, mean absolute difference, and mean squared error.

15. The method of claim 12, wherein the content-dependent threshold depends on overall brightness of the sample values of the given unit.

16. The method of claim 12, wherein significant change is detected in the given frame if, for each of at least a threshold number of units of the given frame, the difference measure is more than the content-dependent threshold.

17. One or more computer-readable memory or storage devices storing computer-executable instructions for causing a processing unit programmed thereby to perform operations comprising:
receiving a given frame of a video sequence;
detecting whether there is significant change in the given frame relative to a control frame stored in a control frame buffer outside a video encoder, wherein the control frame is a version of a previous frame from prior to encoding of the previous frame, including, for each given unit among one or more units of the given frame, detecting whether there is significant change in the given unit relative to a collocated unit of the control frame, wherein significant change is detected in the given frame if significant change is detected for at least a threshold number of units of the given frame;
if significant change is detected in the given frame, storing the given frame in the control frame buffer, thereby replacing the control frame, and passing the given frame to the video encoder, such that a bitstream output by the video encoder includes coded data for the given frame; and
if significant change is not detected in the given frame, dropping the given frame without replacing the control frame in the control frame buffer and without passing the given frame to the video encoder, such that the bitstream lacks any coded data for the given frame.

18. The one or more computer-readable memory or storage devices of claim 17, wherein the detecting whether there is significant change in the given unit relative to the collocated unit of the control frame includes:
calculating a difference measure for sample values of the given unit relative to sample values of the collocated unit of the control frame;
calculating a content-dependent threshold that depends on the sample values of the given unit; and
comparing the difference measure to the content-dependent threshold.

19. The one or more computer-readable memory or storage devices of claim 18, wherein the difference measure is selected from the group consisting of sum of absolute difference, sum of squared differences, mean absolute difference, and mean squared error, and wherein the content-dependent threshold depends on overall brightness of the sample values of the given unit.

20. In a computing system that implements a video encoder, a method comprising:
    receiving a given frame of a video sequence;
    detecting whether there is significant change in the given frame relative to a control frame stored in a control frame buffer, including, for each given unit among one or more units of the given frame:
    calculating a difference measure for sample values of the given unit relative to sample values of a collocated unit of the control frame;
    calculating a content-dependent threshold that depends on the sample values of the given unit, and wherein the content-dependent threshold changes depending on whether the sample values of the given unit are gamma-corrected values; and
    comparing the difference measure to the content-dependent threshold;
    if significant change is detected in the given frame, storing the given frame in the control frame buffer, thereby replacing the control frame, and passing the given frame to the video encoder, such that a bitstream output by the video encoder includes coded data for the given frame; and
    if significant change is not detected in the given frame, dropping the given frame without replacing the control frame in the control frame buffer and without passing the given frame to the video encoder, such that the bitstream lacks any coded data for the given frame.

* * * * *